United States Patent [19]
Takeuchi et al.

[11] 3,870,973
[45] Mar. 11, 1975

[54] INPUT MAGNETIC FIELD SENSING SYSTEM WITH UTILIZATION OF A HYSTERESIS PHENOMENON

[75] Inventors: Shinjiro Takeuchi; Satoshi Ichioka, both of Toda, Japan

[73] Assignee: Mishima Kosan Co., Ltd., Kitakyushu City, Fukuoka Prefecture, Japan

[22] Filed: Feb. 20, 1974

[21] Appl. No.: 444,551

Related U.S. Application Data

[63] Continuation-in-part of Ser. No. 264,521, June 20, 1972, abandoned.

[52] U.S. Cl............................ 332/12, 328/65, 330/8, 332/51 R
[51] Int. Cl........................... H03k 7/08, H03k 9/00
[58] Field of Search............. 332/12, 51 R; 331/87; 328/65; 307/234, 265; 330/8

[56] References Cited
UNITED STATES PATENTS

| | | | |
|---|---|---|---|
| 2,910,652 | 10/1959 | Siedband | 332/12 X |
| 3,001,718 | 9/1961 | Creusere et al. | 330/8 UX |
| 3,131,364 | 4/1964 | Magnin et al. | 332/12 |
| 3,139,595 | 6/1964 | Barber | 332/12 |

*Primary Examiner*—Alfred L. Brody
*Attorney, Agent, or Firm*—Wenderoth, Lind & Ponack

[57] ABSTRACT

An input magnetic field sensing system which utilizes hysteresis in a magnetic material comprises an input magnetic field component, an input magnetic field converter utilizing the hysteresis phenomenon, a shaping means, an integrating means and a control means whereby an inverted signal for compensating the input magnetic field according to a signal sensed by the converter is fed back to the input magnetic field converter so as to form a self hysteresis oscillation system and an information concerning with the input magnetic field is sensed from the inverted feedback signal.

2 Claims, 5 Drawing Figures

3,870,973

INPUT MAGNETIC FIELD SENSING SYSTEM WITH UTILIZATION OF A HYSTERESIS PHENOMENON

CROSS-REFERENCE TO RELATED APPLICATION

This application is a continuation-in-part application of our copending application Ser. No. 264,521 filed June 20, 1972, now abandoned.

BACKGROUND OF THE INVENTION

The present invention relates to an input magnetic field sensing system for sensing an input magnetic field with the use of an input magnetic field converter which exhibits the hysteresis phenomenon.

In the conventional input magnetic field converters, particularly in the situation where an analog quantity is being sensed, it is a usual practice to design the input magnetic field converter to avoid the influence of the system's characteristics to the maximum possible extent.

SUMMARY OF THE INVENTION

An object of the present invention to provide an input magnetic field sensing system for sensing an input magnetic field with high sensitivity by using input magnetic field converters which utilize the phenomenon of hysteresis in the conversion process.

According to the invention, an input magnetic field system comprises an input magnetic field converter having hysteresis characteristics, a shaping means, an integrating means and a control means. This system is characterized by the fact that an inverted signal for the purpose of compensating an input magnetic field according to a signal sensed by the input magnetic field converter is fed back to said converter to form a self hysteresis oscillation system, and information relating to the input magnetic field is derived and sensed from the inverted signal, and an input magnetic field sensing system which utilizes a hysteresis phenomenon comprising an input magnetic field converter having hysteresis characteristics, i.e., B-H characteristics, shaping means, an integrating means and an information sensing means, is characterized by the fact that an inverted signal for compensating an input magnetic field according to a signal sensed by the input magnetic field converter is fed back to said converter so as to form a self hysteresis oscillation system, and a information concerning the input magnetic field is sensed from a difference of duration of a reference signal produced by the shaping means.

BRIEF DESCRIPTION OF THE DRAWINGS

The specific nature of the present invention and advantages thereof will become clearly evident from the following detailed description of preferred embodiments taken in conjunction with the accompanying drawings in which.

DESCRIPTION OF PREFERRED EMBODIMENT

Figure 1:
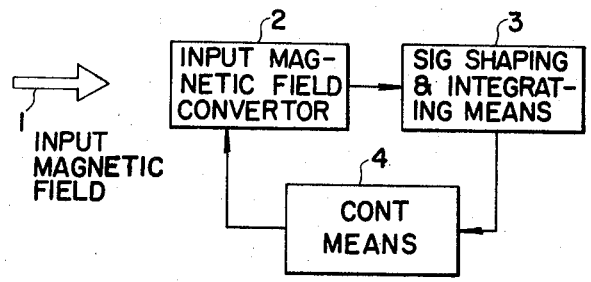
FIG. 1 is a block diagram for explaining a fundamental construction of a first embodiment of the system according to the present invention.

In reference to the drawings, FIG. 1 is a block diagram for explaining a fundamental construction of a first embodiment of the system according to the invention. In FIG. 1 reference numeral 1 is an input magnetic field, 2 is an input magnetic field converter exhibiting hysteresis phenomenon, and 3 is a shaping and integrating means. The input magnetic field converter 2, the shaping and integrating means 3 and a control means 4 as described later form a hysteresis oscillation system for generating an inverted feedback signal which is preferably a gradually increasing signal (which different-coefficient is positive or zero) or a gradually decreasing signal (which differential-coefficient is negative or zero) caused by a reversing or skipping hysteresis phenomenon of the input magnetic field converter. The control means 4 has the functions of applying the inverted feedback signal to the input magnetic field converter and of deriving information concerning the input magnetic field from the inverted feedback signal.

In this system while it is apparent that the hysteresis oscillation phenomenon is generated, the inventors have found that the inverted feedback signal waveform exhibits the hysterisis characteristics of the input magnetic field converter, and the output waveform of the shaping and integrating means and the input magnetic field component are superimposed and the input magnetic field sensing system for sensing the information relating to the input magnetic field by deriving the input magnetic field component from the inverted feedback signal may thus be established. Further the function of the shaping and integrating means is totally or partially carried out by means of a single element or a plurality of elements.

Further, a means for carrying out the function of the shaping and integrating means is not limited to a particular means. Any input magnetic field converter may be used in the system of the invention, as long as the input magnetic field converter exhibits the hysteresis phenomenon. The self hysteresis oscillation system can be mechanical, physical, electrical or the like. For instance, an electrical input signal converter may be any device having a hysteresis phenomenon accompanied by a skipping phenomenon in a magnetic device such as a magnetic modulator or the like.

Further, in the system of the present invention, the feature of constructing the hystersis oscillation system is presupposed, so that it is necessary to adjust the functions of each component in order to operate the hysteresis characteristics of the input signal converting element in a stable manner.

Figure 2:
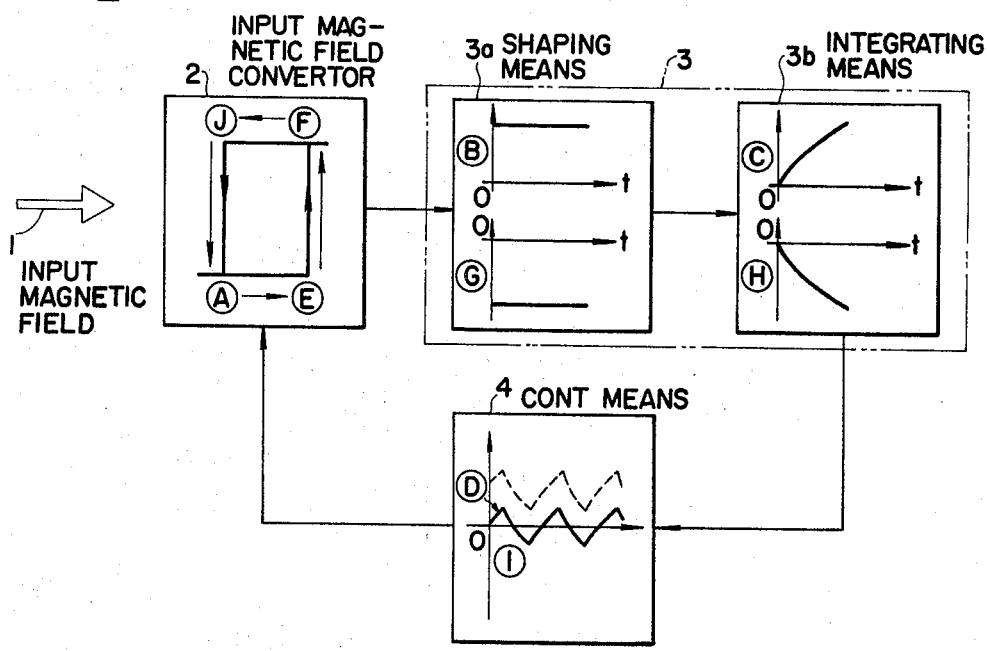
FIG. 2 is a block diagram for explaining the operation of the first embodiment.

For instance, an output of the input signal converter should be prevented from entering into the above-described adjusting and controlling means of the delay function. Moreover, it is necessary that the inverted feedback signal is effectively applied to the input signal converter from the control means, and further adjustments should be made such that the hysteresis characteristics of the input signal converter is reversed or skipped and stably repeated by the inverted feedback signal. FIG. 2 is a block diagram for explaining the operation of the first embodiment. In FIG. 2, reference numeral 1 is an input magnetic field, 2 is an input magnetic field converter having a hysteresis phenomenon, 3a is a shaping means for generating a positive or negative constant voltage according to the state of the input magnetic field converter utilizing hysteresis phenomenon, 3b is an integrating means having a delay function, and 4 is a control means having the functions of inversely feeding back an output of the integrating means 3b to the input magnetic field converter and of deriving therefrom information concerning the input magnetic field. An object of the delay function of the integrating means 3b will be explained as follows. This object lies in causing a stable repetition of the hysteresis phenomenon of the input magnetic field converter and in this embodiment, this is achieved by integrating the output of the shaping means.

At first, assuming that the state of the hysteresis characteristics of the input magnetic field converter 2 is A, an output B corresponding to the state A, appears at shaping means 3a, and the integrating means 3b generates an output such as C as a result of integrating the output B. The output C is fed back inversely as an inverted feedback signal D to the input magnetic field converter 2 through the control means 4 and compensates the input magnetic field. Therefore, the state of the hysteresis characteristics of the input magnetic field converter changes from A to E to F. When the state of the hysteresis characteristics reaches F, the output of the shaping means 3a becomes G and the output of the integrating means 3b becomes H and the output H is inversely fed back as an inverted feedback signal 1 to the input magnetic field converter through the control means 4, so that the state of the hysteresis characteristics changes from F to J to A. Thus, the self hysteresis oscillation system includes the input magnetic field the input magnetic field converter having a hysteresis phenomenon, the shaping means, the integrating means and the control means.

When an input magnetic field is applied to the input magnetic field converter of the self hysteresis oscillation system, a difference in the duration of the output B or G of the shaping means 3a is caused according to the input magnetic field and the inverted feedback signal becomes, as shown in the control means 4 by a dotted line, an AC component superimposed on information (DC component) concerning the input magnetic field, so that if such DC component is derived from the inverted feedback signal, the information corresponding to the input magnetic field can be sensed.

Figure 3:
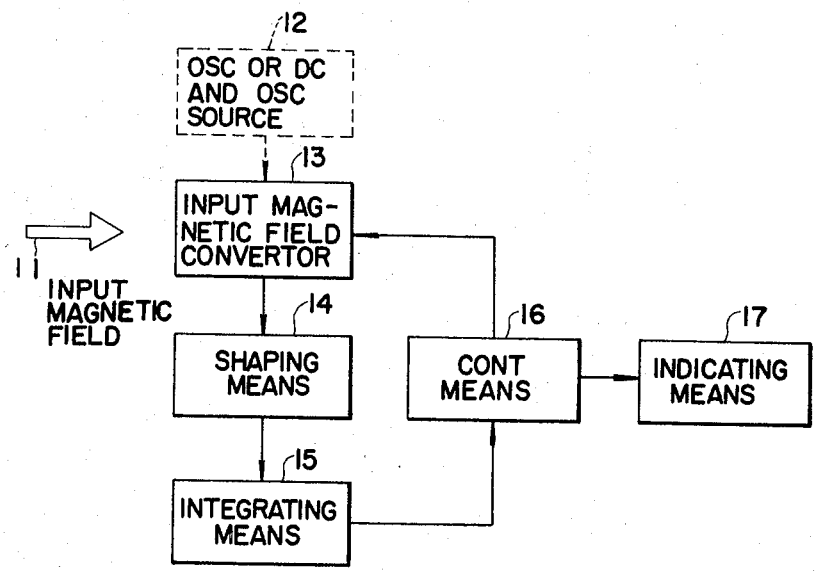
FIG. 3 is a block diagram showing the first embodiment of the system in case of using a single core sensor.

FIG. 3 is an embodiment incorporating a single core sensor (parametric excitation resonance circuit (inclusive of oscillation)) as an input magnetic field. In FIG. 3, 11 is an input signal which influences the hysteresis characteristics such as current, magnetic field or the like. 12 is an external excitation source for exciting a core of a fundamental element by which a parametric oscillator, a magnetic amplifier and a magnetic modulator are constructed when a jumping phenomenon of these devices is utilized, 13 is a single, core sensor, 14 is a shaping means, 15 is an integrating means, 16 is a control means, and 17 in an indicating means. The indicating means 17 has the function of indicating a converted input magnetic field to an electric signal. The detailed operation thereof can easily be understood from the preceding paragraph, and is thus omitted.

In the present invention, when an output voltage characteristic under the operative conditions by means of the parametric oscillator, the magnetic amplifier and the magnetic modulator which are operated by the external excitation source 12 represents a hysteresis characteristic, the parametric oscillator, the magnetic amplifier and the magnetic modulator may by utilized as an input magnetic field converter. When a B-H characteristic of a circuit system generating a hysteresis phenomenon under self oscillation condition, for example a B-H characteristic of a core showing a hysteresis characteristic by using in a self hysteresis oscillation circuit system according to the invention is utilized, then the external excitation source 12 may be abbreviated. While the oscillation frequency $f_o$ of the self hysteresis oscillation circuit system differs from the excitation frequency $f_{ex}$ of the enter na/ excitation source 12. The relation between these frequencies becomes as follows:

$f_{ex} >> f_o$

Figure 4:
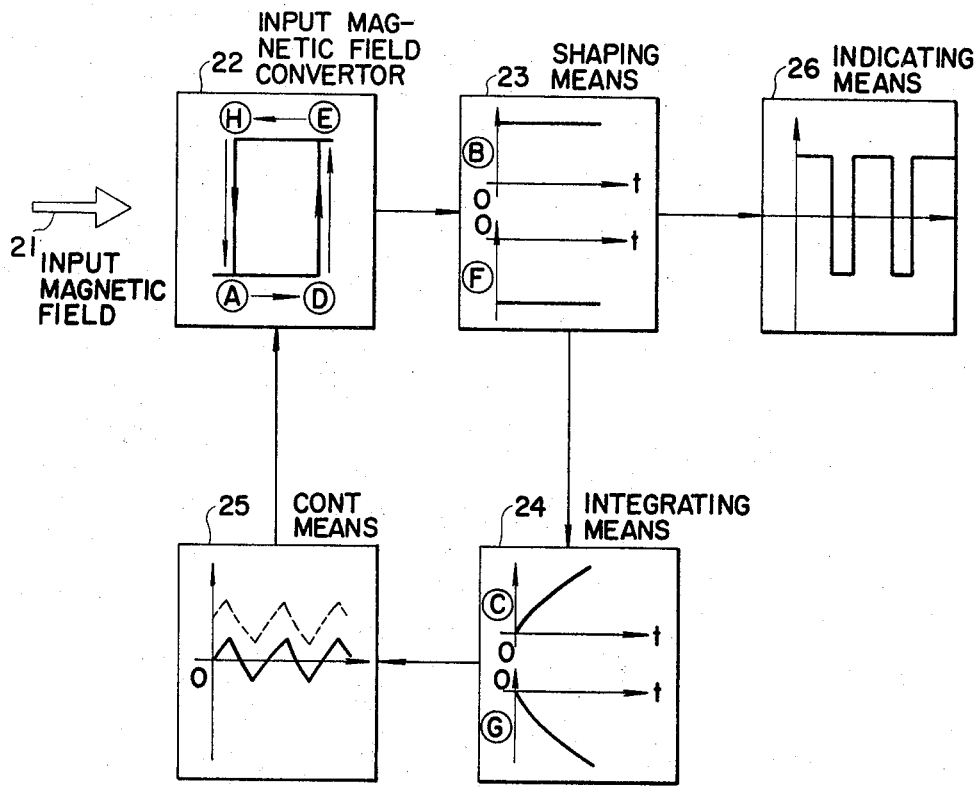
FIG. 4 is a block diagram for explaining a fundamental construction of a second embodiment of the system according to the present invention.

FIG. 4 is a block diagram for explaining a fundamental construction of second embodiment of the system according to the invention. In FIG. 4, 21 is an input magnetic field, 22 is an input magnetic field converter having a hysteresis phenomenon, 23 is a shaping means for generating a positive or negative reference signal according to the state of the input magnetic field converter, 24 is an integrating means having the functions of delaying an inversely feeding back the signal to the input signal converter, 25 is a control means and 26 is an indicating means for sensing and indicating information concerning the input magnetic field by means of a defference in the duration of the positive and negative reference signals. An object of the delay function of the integrating means 24 will be explained. The object specifically is to travel around the hysteresis loop in a stable fashion and in this embodiment this is accomplished by integrating the output of the shaping means.

Assuming that the state of the hysteresis characteristics of the input converter 22 is initially A, an output B appears on the shaping means 23 in proportion to the state A, and the output B is integrated in the integrating means 24, so that an output C is generated. The output C is fed back as an inverted feedback signal to the input magnetic field converter 22 and operates to compensate the input magnetic field. Therefore, the state of hysteresis characteristic of the input magnetic field converter is changed from A to D to E and when the state of the hysteresis characteristics is E, the output of the shaping means 23 becomes F and the output of the integrating means 24 becomes G, and the output G is fed back inversely as an inverted feedback signal, so that the state of the hysteresis characteristic is changed from E to H to A. Thus, a self hysteresis oscillation system is constructed by the input magnetic field converter exhibiting hysteresis, the shaping means and the integrating means.

When an input magnetic field is applied to the input magnetic field converter of this self hysteresis oscillation system, a difference is caused in the duration of the outputs B and F of the shaping means 23 according to the input magnetic field, so that information corresponding to the input magnetic field is reversed from the pulse duration thereof or the difference in the pulse durations thereof.

Figure 5:
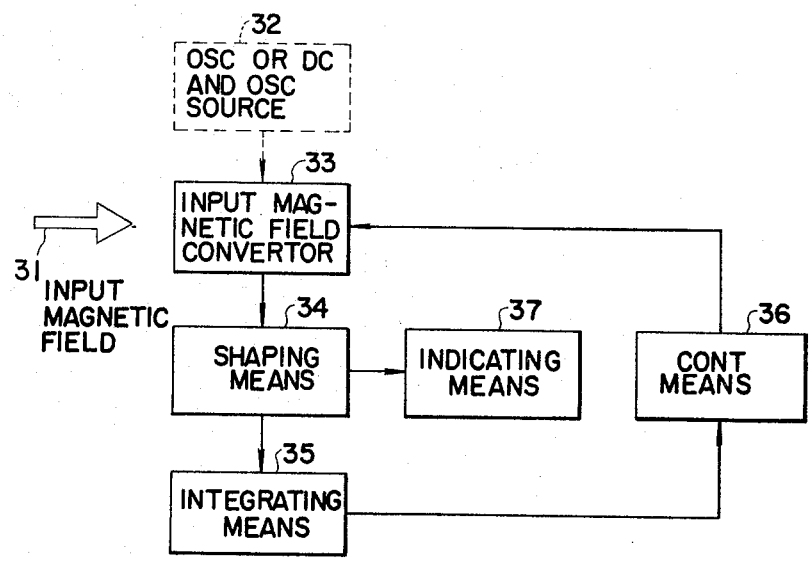
FIG. 5 is a block diagram showing the second embodiment of the system using a single core sensor.

In FIG. 5, a second embodiment is illustrated using a single core sensor as an input magnetic field converter. In FIG. 5, 31 is an input signal which has an influence upon current and magnetic field. 32 is an external excitation source for exciting a core of a fundamental element by which a parametric oscillator, a magnetic amplifier and a magnetic modulator are constructes when a jumping phenomenon of these devices is utilized, 33 is a single core sensor, 34 is a shaping means, 35 is an integrating means, 36 is a control means and 37 is an indicating means. The indicating means 37 has the functions of detecting the pulse duration and of indicating the difference of the pulse duration as a digital and of indicating the difference of the pulse duration as a digital or analog quantity.

As apparent from the above explanation, the input magnetic field sensing system according to the invention utilizes a self hysteresis oscillation system by applying the inverted feedback signal to the input magnetic field converter for compensating the input magnetic field according to the detected signal sensed by the input magnetic field converter having the hysteresis phenomenon, and by sensing an information concerning the input signal from the output signal of the shaping means to that by the use of the present invention it is possible to sense an input magnetic field with high sensitivity.

What is claimed is:

1. An input magnetic field sensing system which utilizes a magnetic hysteresis phenomenon, comprising:
   an input magnetic field converter having hysteresis characteristics for converting an input magnetic field into an electrical signal;
   a shaping means coupled to said converter for shaping the output signal of the converter into a positive or negative constant voltage according to the state of said electric signal;
   an integrating means coupled to said shaping means and having a delay function for integrating the output signal of said shaping means;
   a control means having an input to said integrating means and an output coupled to another input of the input magnetic field converter for controlling the state of the hysteresis characteristics of said converter; and
   an indicating means connected to the output of said control means for indicating the magnitude of the input magnetic field whereby an inverted signal for compensating an input magnetic field according to a signal sensed by the converter is fed back to the converter so as to form a self hysteresis oscillation system, and whereby information concerning the input magnetic field is derived and sensed from the d.c. levels of the inverted signal.

2. An input magnetic field sensing system utilizing a magnetic hysteresis phenomenon, comprising:
   an input magnetic field converter having hysteresis characteristics for converting an input magnetic field into an electrical signal;
   a shaping means connected to said converter for shaping the output signal of the converter into a positive or negative constant voltage according to the state thereof;
   an integrating means having a delay function for integrating the output signal of the shaping means and connected thereto;
   a control means having an input coupled to said integrating means and an output coupled to another input of the input magnetic field converter for controlling the state of the hysteresis characteristics of the converter and an indicating means connected to the output of the shaping means for indicating the magnitude of the input magnetic field whereby an inverted signal for compensating an input magnetic field according to a signal sensed by the converter is fed back to said converter to form a self hysteresis oscillation system, and whereby information concerning with the input magnetic field is sensed from a pulse duration or a difference of the duration of the output pulses of the shaping means.

* * * * *